United States Patent [19]
Dubois, Sr.

[11] 4,366,735
[45] Jan. 4, 1983

[54] WORKPIECE HOLDING DEVICE

[76] Inventor: Russell E. Dubois, Sr., 142 Chippewa, Clawson, Mich. 48017

[21] Appl. No.: 180,966

[22] Filed: Aug. 25, 1980

[51] Int. Cl.³ ............................................. B23B 31/40
[52] U.S. Cl. ..................................... 82/44; 228/231; 279/2 A
[58] Field of Search ........................... 82/44; 279/2 A; 242/72 R, 72 B

[56] References Cited
U.S. PATENT DOCUMENTS

| | | | |
|---|---|---|---|
| 1,346,917 | 7/1920 | Sherman | 82/44 |
| 1,818,042 | 8/1931 | Christman | 82/44 |
| 3,587,371 | 6/1971 | Sherwood | 279/2 |
| 3,761,008 | 9/1973 | Goulder | 279/2 |

Primary Examiner—Leonidas Vlachos
Attorney, Agent, or Firm—Basile, Weintraub & Hanlon

[57] ABSTRACT

A workpiece holding device having an expandable mandrel for engaging a bore of the workpiece is disclosed. The holding device includes an expandable sleeve of generally cylindrical shape having a thin outer shell with a pair of opposed thick wall circular ends integral with the shell extending radially inward to form a bore. An elongated generally circular central body with a central bore for containing pressure and adapted to be mounted on a machine tool having an outside diameter engageable with the bore. A pair of opposed arcuate undercut grooves are formed at an intersection of the outer shell and the circular ends to prevent the formation of destructive stress concentration at the intersection. Chamfers are formed at the outer edges of the bore and copper rings are inserted therein and melted to form a seal between the bore and mount the expandable sleeve to the central body.

1 Claim, 6 Drawing Figures

WORKPIECE HOLDING DEVICE

BACKGROUND OF THE INVENTION

I. Field of the Invention

The present invention generally relates to the field of workpiece holding devices, and in particular, the present invention is concerned with workpiece holding devices which include an expandable arbor having a thin shell that expands radially in response to a hydrostatic pressure imposed at the interior of the shell.

II. Description of the Prior Art

Workpiece holding devices having an expanding arbor which expands in response to a hydrostatic pressure imposed against a thin cylindrical shell are known. Examples of United States Letters Patents disclosing workpiece holding device utilizing a thin shell responsive to hydrostatic pressure are disclosed in U.S. Pat. Nos: 1,818,042; 2,797,603; and 3,166,013. Examples of brazed joints wherein a thin shell is joined to a central body are disclosed in U.S. Pat. Nos: 2,646,995 and 2,684,043 as well as disclosed in the United States Patents listed hereinabove. None of the above listed United States Patents disclose the support used by the present invention for the thin outer shell comprising thick wall ends and the use of chamfers to retain a copper ring for subsequent melting of the ring to form a seal and join the expandable sleeve to the central body.

III. Prior Art Statement

The aforementioned prior art, in the opinion of the Applicant and the Applicant's Attorney represents the closest prior art of which the Applicant and his Attorney are aware.

SUMMARY OF THE INVENTION

The present invention which will be described in greater detail hereinafter comprises a workpiece holding device having an expandable mandrel for engaging a bore of the workpiece. The expandable mandrel comprises an expandable sleeve of generally cylindrical shape including a thin outer shell with a pair of opposed thick wall circular ends integral with the outer shell which extend radially inward to form a bore. The bore is engageable with an outer diameter of a generally elongated circular central body having a central bore for containing pressure. The central body is adapted to be mounted on a machine tool. A pressure imposed in the central bore causes a radially outward movement of the outer shell to engage the workpiece. Arcuate undercut grooves formed at an intersection of the thin outer shell and the circular ends prevent the formation of stress concentrations at the intersection. Chamfers formed at the ends of the bore are adapted to receive a copper ring and retain the ring in position for melting. Upon melting the copper ring forms a seal and a joint between the central body and the circular ends.

It is therefore a primary object of the present invention to provide a new and improved workpiece holding device.

It is a further object of the present invention to provide such a workpiece holding device which incorporates a radially expandable shell responsive to hydrostatic pressure.

It is yet another object of the present invention to provide a work piece holding device wherein the radially expandable shell is supported in such a way that stress concentrations at the intersection between the shell and its support are minimized.

It is a further object of the present invention to provide a workpiece holding device wherein the shell is joined to a central body adapted to be mounted to a machine tool.

It is yet another object of the present invention to provide a workpiece holding device wherein the shell is joined to the central body by a copper ring positioned in a chamfer and melted to form a seal.

Further objects, advantages, and applications of the present invention will become apparent to those skilled in the art of workpiece holding devices when the accompanying description of one example of the best mode contemplated for practicing the invention is read in conjunction with the accompanying drawing.

BRIEF DESCRIPTION OF THE DRAWING

In the drawing like reference numbers refer to like parts throughout the several views and wherein.

DESCRIPTION OF THE PREFERRED EMBODIMENT

Figure 1:
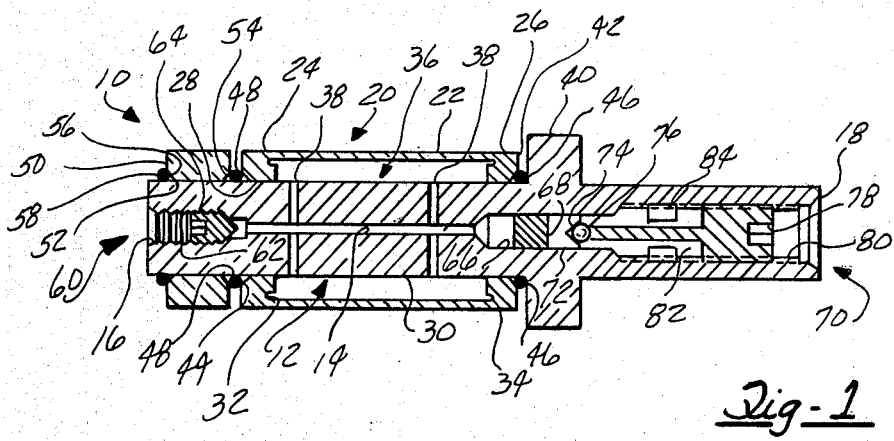
FIG. 1 is a cross sectional view of a preferred embodiment of the present invention.

Referring now to the drawing, there is illustrated in FIG. 1 one example of the present invention in the form of a workpiece holding device 10. The device 10 comprises an elongated generally circular central body 12 having a central bore 14 for containing pressure. The central body 12 includes at the ends thereof a pair of center chamfers 16,18 to facilitate mounting of the central body on a machine tool in a known manner. The workpiece holding device 10 further includes an expandable sleeve 20 of generally cylindrical shape including a thin outer shell 22 and a pair of opposed thick wall circular ends 24,26 integral with the outer shell and extending radially inward therefrom to form a bore adapted to engage an outer diameter 30 of the central body 12. A pair of opposed arcuate undercut grooves 32,34 are formed at an intersection of the outer shell 22 and the thick wall circular ends 24,26 to avoid the formation of stress risers and an early failure of the outer shell in response to repeated applications of hydrostatic pressure against the shell. When the thin outer shell 22 and the pair of thick wall circular ends 24,26 are assembled over the outer diameter 30 of the central body, an annular space 36 is formed therebetween. A means is provided such as radial bores 38 which intersect the central bore 14 to communicate the central bore with the annular space 36. Pressure imposed on the central bore 14 is transmitted to the annular space 36 and causes a radially outward movement of the outer shell to engage a bore of the workpiece (not shown). The arcuate undercut grooves 32,34 permit a smooth, gradual transition of the thin outer shell 22 to the comparatively thick walled circular ends 24,26 to minimize stress concentrations at the intersection of the outer shell 22 and the circular ends 24,26.

The central body 12 further includes a raised collar 40 formed near an end thereof. A first chamfer 42 and a second chamfer 44 are formed at the outer edges of the bore 28. A first copper ring 46 is wedged between the collar 40 and the first chamfer 42 securing the copper ring 46 in abutment with the collar 40 and the first chamfer 42 until the ring is melted to form a seal as will be described subsequently. A second copper ring 48 is placed in abutment with the second chamfer 44, and a metallic ring 50 having an inside diameter 52 complementary to the outer diameter 30 and a third chamfer 54, is placed over the central body 12 to secure the second copper ring 48 as it is melted to form a seal. The configuration of the expandable sleeve 20 and its attachment to the central body 12 in the manner described hereinabove by the use of melted copper rings provides a device wherein minimum stresses are imposed on the thin outer shell 22 where it blends into the thick walls circular ends 24,26 utilizing the pair of opposed arcuate undercuts grooves 32,34. Further, no longitudinal tensile stress is imposed upon the outer shell 22 by the natural tendency of the circular ends 24,26 to move longitudinally under pressure since they are secured to the central body 12 by the melted copper rings 46,48. Any tendency for the circular ends 24,26 to move longitudinally would place the corresponding copper ring under compression which in turn would impose the load upon the collar 40 in the case of the circular end 26 or the metallic ring 50 in the case of the circular end 24. A fourth chamfer 56 formed at an end of the metallic ring 50 at the inside diameter 52 is configured to receive a third copper ring 58 to be melted and form an additional bond between the ring 50 and the central body 12 to further secure the ring 50 against longitudinal movement.

As shown in FIG. 1 of the drawing a first end 60 includes a first threaded bore 62 and a set screw 64 threadingly engaging the first threaded bore to seal the first end 60 against hydrostatic pressure. The central bore 14 is enlarged to form a piston engaging bore 66 to slidingly and sealingly cooperate with a piston 68 which seals a second end 70 of the central body 12 against hydrostatic pressure. A push piston 72 abuts the piston 68, and an outer end thereof has a conical recess 74 formed therein to nestingly receive a ball 76. An adjusting screw 78 threadingly engages a second threaded bore 80, and a reduced diameter end 82 of the adjusting screw 78 is adapted to abut the ball 76 forcing it into the conical recess 74. When the central bore and the annular space 36 are filled with a relatively incompressible fluid, tightening of the adjusting screw 78 produces a selectively variable hydrostatic pressure within the annular space 36 to induce a radially outward movement of the outer shell 22. The piston 68, the ball 76, and the push piston 72 are held in place by a set screw 84 having a hexagonal through bore adapted to slidingly receive the reduced diameter end 82 but not pass the ball 76.

As shown in FIG. 1. of the drawing the expandable sleeve 20 is assembled to the central body 12 with the first copper ring 46 wedged between the first chamfer 42 and the raised collar 40. The second copper ring 48 is then placed in abutment with the second chamfer 44 and the metallic ring 50 is assembled on the central body 12 with the third chamfer 54 squeezing the second copper ring 48 between the second chamfer 44 and the third chamfer 54. The third copper ring 58 is then placed in abutment with the fourth chamfer 56 and the entire assembly 10 is heated to a temperature of between 2010 degrees F. and 2030 degrees F. allowing the copper to melt and form a joint and a seal between the ends 24, 26 and the central body 12. The expandable sleeve 20 is made from a steel having sufficient carbon content and alloying elements such as AMS 6150 or equivalent, so that after the assembly is heated to a temperature of 2010 degrees F. to 2030 degrees F. to melt the copper, the assembly is then cooled to room temperature. The assembly is then reheated to a temperature of between 1650 degrees F. and 1660 degrees F. and quenched in oil, then stress relieved at 750 degrees F. to achieve a sleeve hardness of Rockwell-C 47/49. This degree of hardness provides an outer shell having sufficient strength and ductility to withstand a large number of pressure excursions within the annular space without failure. A flash chrome plating of approximately 0.0002 inches thickness is recommendated to improve wear.

Figure 2:
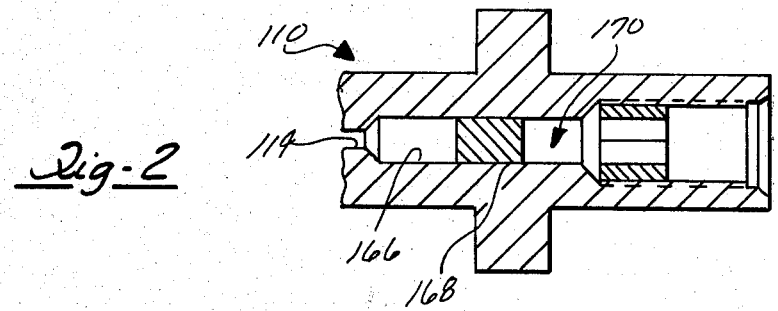
FIG. 2 is a broken cross sectional view of a second embodiment of the present invention wherein external fluid pressure is employed to generate a hydrostatic pressure within the central body.

FIG. 2 of the drawing illustrates at 110 a second embodiment of the present invention wherein a central bore 114 is pressurized by a piston 168 slidingly engaging a piston bore 166 with a fluid pressure selectively imposed on a chamber 170 outward of the piston 168. It can readily be seen by the skilled artisan that any fluid pressure applied to the chamber 170 will cause a corresponding pressure in bore 114 with expandable sleeve 20 (not shown in FIG. 2) responding in a manner described hereinabove.

Figure 3:
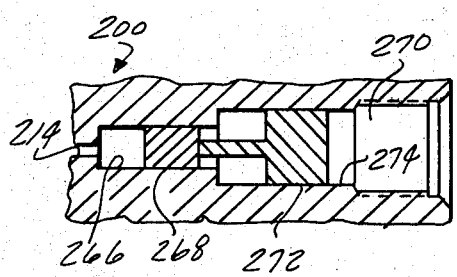
FIG. 3 illustrates a broken cross sectional view of a third embodiment of the present invention wherein a pressure amplifying piston is employed to generate an incresed hydrostatic pressure in the central body.

FIG. 3 of the drawing illustrates at 200, a third embodiment of the present invention incorporating a fluid pressure amplifier to induce a pressure in a central bore 214 in response to a feeble pressure imposed in chamber 270. By providing a piston 272 slidably and sealingly associated with a bore 274 having a size substantially larger than a piston 268, which piston 272 abuts a feeble pressure in chamber 270 will impose an amplified pressure in central bore 214. The pressure amplification ratio corresponds to the square of the ratio of the diameter of piston 272 divided by the diameter of piston 268. Utilizing the pressure amplifier technique, a very feeble signal in chamber 270 such as might be imposed by a fluidic device, can be employed to engage a workpiece.

Figure 4:
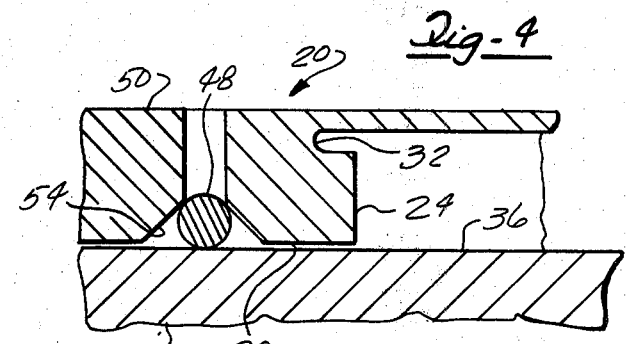
FIG. 4 illustrates an enlarged broken cross sectional view of a copper ring wedged in place prior to melting to join the shell to the central body.

FIG. 4 of the drawing illustrates an enlarged cross section of the joint between circular end 24 and the central body 12 with the second copper ring 48 in place prior to melting of the copper.

Figure 5:
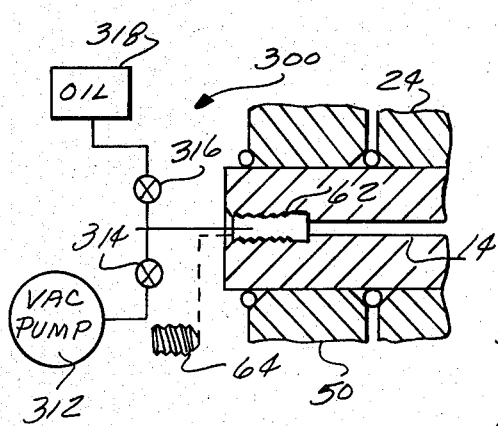
FIG. 5 is the device of FIG. 4 after the copper ring has been melted.

FIG. 5 of the drawing illustrates the configuration of the copper ring 48 after it is melted. It can be clearly seen that the copper from the ring 48 resists any longitudinal motion of the circular end 24 by taking a compressive load and transferring that tendency to move longitudinally to the adjacent metallic ring 50 which is copper welded to the central body 12 in two places.

Figure 6:
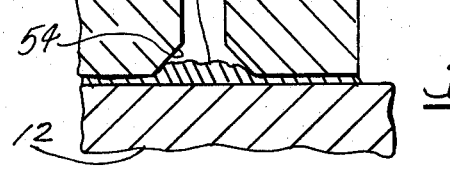
FIG. 6 illustrates a schematic view of a hydraulic circuit for filling the central body with fluid.

It is recommended that the work product holding device 10 be filled with a relatively noncompressible fluid such as hydraulic oil with a minimum of entrained air or bubbles. The recommended filling procedure is illustrated schematically in FIG. 6 of the drawing at 300. A vacuum pump 312 imposes a vacuum on the central bore 14 when valve 314 is opened and valve 316 is closed. Once a substantial vacuum has been opposed on the central bore 14 and substantially all of the air has been evacuated from the central bore and is connecting spaces, valve 314 is closed and valve 316 is opened. Oil is then drawn from reservoir 318 to fill the central bore and its connecting passages and spaces with oil having a minimum amount of entrained air.

A skilled artisan will recognize that the expandable sleeve concept may be reversed with fluid under pressure applied externally to the sleeve to provide a retracting bore (in response to fluid pressure). Such a device would be useful in chucking devices which are well known in machine tools.

It can thus be seen that the present invention has provided a new and improved work product holding device for selectively and releasably engaging a bore of a workpiece which is very economical to produce and can sustain relatively high pressure in its annular space. Further, the present invention provides a work product holding device that can withstand a large number of engagements with a workpiece without failure of its outer shell or the melted copper seals which hold the device together.

It should be understood by those skilled in the art of work product holding devices, that other forms of the Applicant's invention may be had, all coming within the spirit of the invention and the scope of the appended claims.

Having thus described my invention, what I claim is:

1. A workpiece holding device for engaging a bore of a workpiece comprising:

an elongated generally circular central body with a first central bore for containing pressure adapted to be mounted on a machine tool;

an expandable sleeve of generally cylindrical shape including a thin outer shell and a pair of opposed thick wall circular ends integral with the outer shell extending radially inward forming a second central bore engaging an outer diameter of said central body forming an annular space between said expandable sleeve and said central body, means for communicating said first central bore with said annular space;

a raised collar formed near an end of the central body;

a first chamfer and a second chamfer formed at outer edges of the second central bore;

a first copper ring wedged between the collar and the first chamfer and melted to form a seal;

a second copper ring abutting the second chamfer;

a metallic ring having an inside diameter complementary to the outer diameter with a third chamfer abutting the second copper ring with the second copper ring melted to form a seal; further comprising a pair of opposed arcuate undercut grooves formed at the intersection of said outer shell and said circular ends whereby the arcuate undercut grooves prevent the formation of destructive stress concentrations at said intersection; and whereby pressure in the first central bore causes a radially outward movement of said outer shell to engage the workpiece.

* * * * *